United States Patent [19]
Belmuth

[11] 3,745,439
[45] July 10, 1973

[54] D.C. MOTOR SPEED CONTROL
[75] Inventor: Neal W. Belmuth, Great Neck, N.Y.
[73] Assignee: Regent Machinery Corporation, Long Island City, N.Y.
[22] Filed: Aug. 7, 1972
[21] Appl. No.: 278,337

[52] U.S. Cl.................. 321/18, 318/227, 318/332, 321/47
[51] Int. Cl. ............................................. H02m 7/20
[58] Field of Search........................... 318/227, 332; 321/18, 47

[56] References Cited
UNITED STATES PATENTS

| | | | |
|---|---|---|---|
| 3,584,282 | 6/1971 | Reeves et al. | 318/332 |
| 3,050,672 | 8/1962 | Alexanderson | 318/332 X |
| 2,864,989 | 12/1958 | Bradburn, Jr. | 318/332 X |
| 3,336,517 | 8/1967 | Cain | 318/332 |
| 3,443,120 | 5/1969 | Thiele | 321/47 X |
| 3,474,321 | 10/1969 | Ainsworth | 321/18 X |

*Primary Examiner*—William M. Shoop, Jr.
*Attorney*—Alan H. Levine

[57] ABSTRACT

In a D.C. motor speed control, an A.C. power source is connected in series with the primary winding of a current transformer and a controlled rectifier whose output is connected to the armature of the D.C. motor. In addition, the A.C. power source is coupled, via a first full-wave rectifier, to the field winding of the motor, and via a voltage transformer to a second full-wave rectifier. The output winding of the current transformer is connected in parallel with a potentiometer and a third full-wave rectifier. The outputs of the second and third full-wave rectifiers are connected to pulse generating means whose output pulses are connected to the controlled rectifier so as to control the rectified D.C. voltage applied to the motor. When the A.C. source is turned on, the output of the second full-wave rectifier causes the output pulses of the pulse generating means to be decreasingly delayed, thereby causing the rectified voltage to the motor and the motor speed to increase slowly. If during the steady state operation of the motor its load is changed, the line current changes and the output of the third full-wave rectifier adjusts the timing of the pulses to provide a compensating change in the rectified voltage applied to the D.C. motor, thereby regulating the speed of the motor. Since the potentiometer controls the output voltage of the third full-wave rectifier for a given amount of line current, its setting determines the power delivered to the D.C. motor and its operating speed.

8 Claims, 1 Drawing Figure

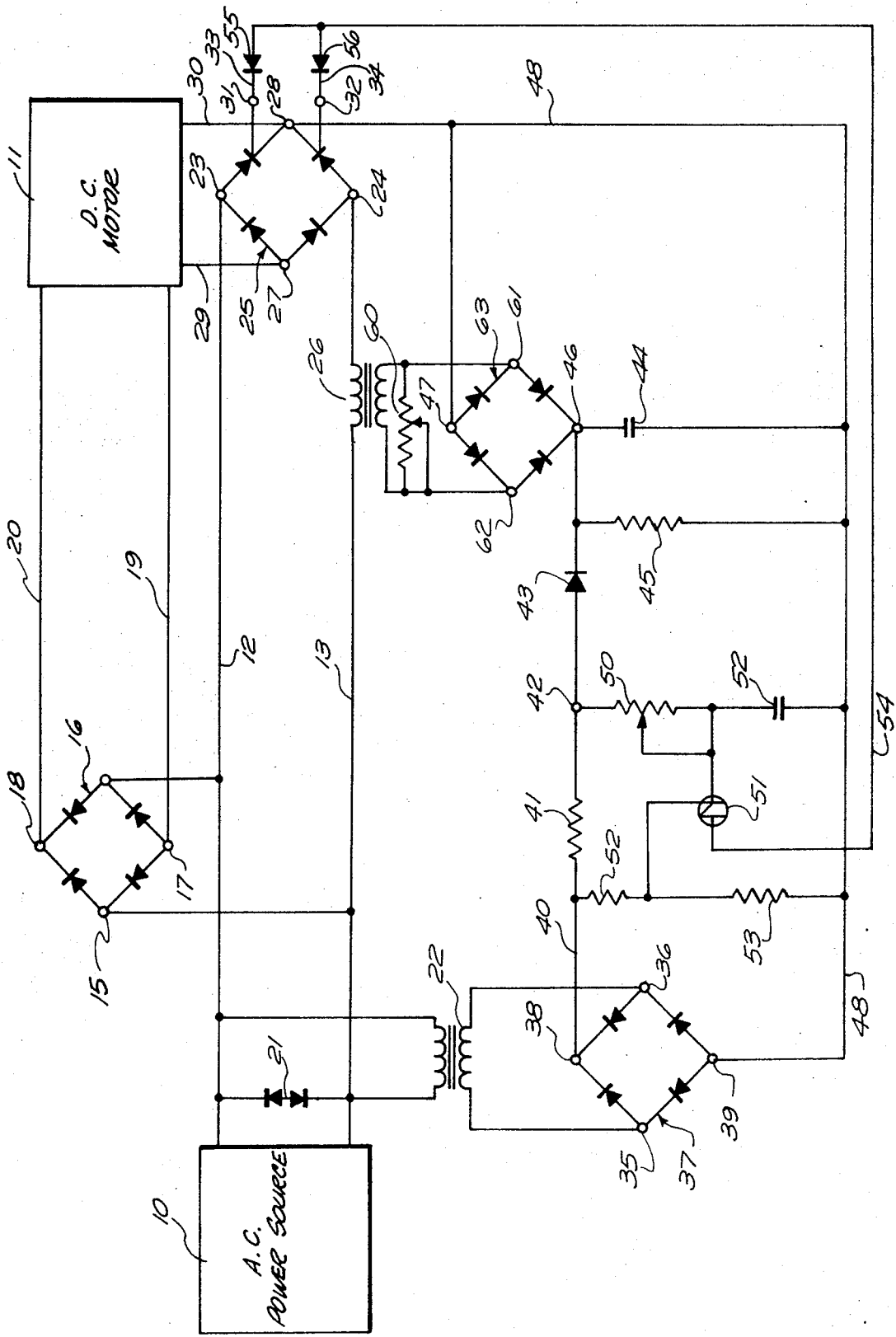

D.C. MOTOR SPEED CONTROL

The subject invention relates to apparatus for regulating the speed of a D.C. motor, i.e., reducing the effect of load changes on the speed of the D.C. motor.

It is an object of the present invention to provide electronic apparatus for regulating the speed of a D.C. motor.

It is another object of the present invention to provide apparatus for regulating the speed of a D.C. motor which is responsive to the current drawn by the armature of the D.C. motor.

Since it is often important, when working with motorized equipment, to build up motion speed slowly so as not to place undue strain on the mechanical drive train, it is still another object of the present invention to provide apparatus for gradually increasing the initial voltage applied to the armature of a D.C. motor, thereby gradually increasing its operating speed.

It is a further object of the invention to provide a D.C. motor control capable of operating a wide variety of shunt wound, series wound, and compound wound motors.

It is an additional object of the invention to provide a motor control employing a feedback regulation system which obviates the need for sensing counter EMF, or for using a tachometer in motor speed control. Thus, the control of the present invention is suitable for use with motors having little or no counter EMF, and in situations wherein capacitors, chokes, resistances, and even more than one motor, are in the motor circuit.

It is still a further object to provide a motor speed control which is so simple that it can be hermetically sealed in a plug-in type enclosure, thereby making the control extremely reliable and easy to service. Furthermore, since the motor control of this invention does not require amplification of counter EMF, it is inherently simple and reliable, and absolutely avoids any danger of "cogging" even at very slow speeds.

The above objects are met, according to the present invention, by apparatus for controlling the speed of a D.C. motor supplied with power from an A.C. power source, comprising: (a) means coupled to the A.C. source for applying a variable rectified voltage to the D.C. motor; (b) means for providing a signal which is proportional to the current drawn from the A.C. power source by the D.C. motor; and (c) means responsive to the signal for varying the rectified voltage applied to the D.C. motor, thereby regulating the speed of the D.C. motor.

The above mentioned and other objects and features of this invention will become apparent by reference to the following description in conjunction with the accompanying drawing, in which:

The FIGURE is a schematic diagram of a D.C. motor and electronic circuitry for controlling the speed of the D.C. motor, according to the invention.

A typical circuit, according to the invention, of electronic apparatus for regulating the speed of a D.C. motor is shown in the FIGURE. In general, the apparatus shown schematically couples an A.C. source 10 to a D.C. motor 11. More particularly, the output power lines 12 and 13 of the A.C. source 10 are connected to the input terminals 14 and 15, respectively, of a full-wave bridge rectifier circuit 16, and the output terminals 17 and 18 of the full-wave ridge rectifier circuit 16 are connected by lines 19 and 20, respectively, to the field winding (not shown) of the D.C. motor 11. Accordingly, when the A.C. source is turned on, the field winding of the D.C. motor is excited. In addition, the lines 12 and 13 are connected parallel to a thyrector diode 21 for suppressing voltage transients and to the primary winding of a stepdown transformer 22. Lines 12 and 13 are also connected to a series circuit comprising the input terminals 23 and 24 of a controlled full-wave bridge rectifier 25, and to the primary winding of a current transformer 26. The controlled full-wave rectifier 25 has its output terminals 27 and 28 connected by lines 29 and 30, respectively, to the armature winding (not shown) of the D.C. motor, and its gate terminals 31 and 32 connected to lines 33 and 34, respectively. Thus, when the A.C. source is turned on, the controlled full-wave bridge rectifier 25 applies, subject to control signals at the gate terminals 31 and 32 which are more fully described below, a rectified voltage to the armature of the D.C. motor 11. The rectified voltage applied to the armature of the D.C. motor controls its speed.

The circuit shown in the figure includes circuitry which controls the rate at which the D.C. motor 11 is brought up to its operating speed, and circuitry which regulates the operating speed of the D.C. motor. Specifically, the secondary winding of the voltage transformer 22 is connected to the input terminals 35 and 36 of a full-wave bridge rectifier 37. Thus, the output terminals 38 and 39 of the full-wave bridge rectifier 37 provide a full-wave rectified voltage. Terminal 38 is connected, via line 40, to one end of a resistor 41 whose other end is connected to a terminal 42. Terminal 42 is connected to the anode of a diode 43 whose cathode is connected to one end of a resistor 45, and via terminal 46 to one end of a capacitor 44. The other end of resistor 45 and the other end of capacitor 44 are each connected via line 48 to the output terminal 39 of the full-wave bridge rectifier 37. The component values of the resistor 45 and the capacitor 44 are chosen such that when the A.C. power source 10 is turned on each sinusoidal pulse cycle from the full-wave rectifier 37 increases the charge on the capacitor 44 until the voltage across the capacitor 44 is slightly less than the peak value of the rectified voltage. As is well known, the actual voltage reached across the capacitor 44 is determined by the forward voltage drop of the diode 43, the leakage current of the capacitor 44, and the peak voltage of the rectified voltage supplied by the full-wave rectifier bridge 37. Typically, the values of the resistor 45 and the capacitor 44 are chosen so that a 48V output at the secondary winding of the transformer 22 charges the capacitor 44 to a steady state value of 35 volts in about 10 seconds.

It should be noted that during the charging process of the capacitor 44, the voltage at terminal 42 is limited each time the diode 43 conducts to charge the capacitor 44 and that the limiting level increases as the charge on the capacitor 44 increases. Thus, as a function of time, the voltage at terminal 42 resembles sinusoidal pulses whose peaks have been clipped, the amount being clipped from successive pulses decreasing with time. However, in the steady state, the diode 43 draws current to compensate for leakage from the capacitor 44. Therefore, the peak voltage at terminal 42 is slightly clipped in the steady state. The steady state clipping level may be varied, as more fully described below, to regulate the speed of the motor 11.

Terminal 42 is connected to one end of a variable resistor 50 whose other end is connected to the cathode of a silicon unilateral switch 51, and to an end of a capacitor 52. The other end of the capacitor 52 is connected, via line 48, to terminal 39. The anode gate of the silicon unilateral switch 51 is connected via resistor 52 to line 40, and via resistor 53 to line 48. In effect, resistors 52 and 53 comprise a voltage divider across the output terminals 38 and 39 of the full-wave bridge rectifier 37. The anode of the silicon unilateral switch 51 is connected by line 54 to the anode of a diode 55 whose cathode is connected to gate terminal 31, and to the anode of a diode 56 whose cathode is connected to the gate terminal 32. Thus, when the A.C. power source is first turned on, the pulsating rectified voltage at terminal 42 periodically causes capacitor 52 to charge and the anode gate periodically discharges the capacitor 52. As time goes by the rectified voltage pulses at terminal 42 increase to a level which is sufficient to charge the capacitor 52, via resistor 50, to a voltage which exceeds the threshold level of the silicon unilateral switch 51 before it has been discharged by the voltage applied to the anode gate. When voltage across the capacitor 52 exceeds the threshold level of the silicon unilateral switch 51, the silicon unilateral switch 51 switches from its blocking state into its conducting state. Thus, a pulse is applied via line 54, and diodes 55 and 56 to the gate terminals 31 and 32 of the controlled full-wave bridge rectifier 25, thereby causing the controlled full-wave bridge rectifier 25 to apply a rectified voltage to the armature of the D.C. motor 11.

Initially, the pulses are applied to the controlled full-wave bridge rectifier 25 towards the end of a voltage cycle from the A.C. power source 10. However, as time goes by and the amplitude of the voltage pulses at terminal 42 increases, the threshold voltages level across the capacitor 52 is reached earlier and earlier in time. Accordingly, the output pulses applied to the gate terminals 31 and 32 occur earlier and earlier with respect to the output voltage cycles of the A.C. power source 10. As a result, the magnitude of the rectified voltage applied by the controlled full-wave bridge rectifier 25 to the D.C. motor 11 increases. Eventually, as the peak voltage of the rectified pulses at terminal 42 asymptotically approach a steady state level, the rectified voltage applied to the D.C. motor 11 approaches its operating level. Since, for a given peak voltage at terminal 42, the variable resistor 50 controls the time required to charge capacitor 52, the setting of the variable resistor 50 determines the amount of time required to bring the D.C. motor up to its operating speed.

To regulate the speed of the D.C. motor 11, the secondary winding of the current transformer 26 is connected in parallel with a variable resistor 60 and the input terminals 61 and 62 of a full-wave bridge rectifier 63. One output terminal 46 of the full-wave rectifier bridge 63 is, as previously mentioned, connected to the cathode of diode 43, the resistor 45, and capacitor 44. The other output terminal 47 of the full-wave rectifier bridge 63 is connected via wire 48 to terminal 28 of the controlled full-wave bridge rectifier 25. Typically, when the D.C. motor 11 is driving a normal load at a desired speed, the current drawn from the A.C. power source 10 over line 13 causes a voltage to appear across the input terminals 61 and 62 of the full-wave rectifier 63 which is dependent upon the setting of the variable resistor 60. Under steady state conditions, the full-wave bridge rectifier 63 only supplies enough current to the capacitor 44 to partially overcomes its leakage current. However, if the load on the motor is suddenly increased, thereby causing an increase in the current drawn from the A.C. power source 10, the voltage at terminals 46 and 42 is caused to rise, thereby causing the voltage across the capacitor 44 to be increased. The increased voltage across the capacitor 44 causes the peak voltage of the sinusoidal pulses at terminal 42 to go up and, consequently, the rectified voltage applied by the controlled rectifier 25 to the D.C. motor 11 is increased. As a result, the speed of the D.C. motor 11 tends to remain constant. On the other hand, if the load on the D.C. motor 11 is reduced, the current drawn from the A.C. power source 10 is reduced, the voltage between terminals 46 and 47 drops, and the voltage at terminal 42 drops, so as to decrease the rectified voltage being applied by the controlled full-wave rectifier 25 to the D.C. motor 11. Thus, it may be seen that the load driven by the D.C. motor 11 may be changed without affecting the output speed of the D.C. motor.

It should be noted, that for a predetermined amount of current from the A.C. power source 10, the variable resistor 60 may be used to control the rectified voltage being applied to the D.C. motor, thereby controlling the nominal speed of the D.C. motor 11. Further, it should be noted that the full-wave bridge rectifier 63 provides an output voltage as soon as the D.C. motor starts drawing current. However this output, as seen at terminal 42, is of a secondary order with respect to the voltage provided at terminal 42 by the full-wave bridge rectifier 37. Thus, the rate at which the speed of the D.C. motor increases when the motor is started is primarily controlled by the variable resistor 50.

Moreover, although the embodiment described above includes circuitry for bringing the D.C. motor 11 up to speed slowly, thereby minimizing transient strains on the motor's mechanical drive train, some of the circuitry may be dispensed with if this feature is not required, while retaining the steady state regulation aspects of the invention. For example, this may be achieved by connecting the secondary winding of transformer 26 and the variable resistor 60 in series with the secondary winding of the transformer 22. The series connection is made such that the voltage to the pulse producing means, i.e., the resistors 41, 50, 52, 53, the capacitor 52, and the silicon unilateral switch 51, increases when the D.C. motor's load is increased. In such event, the full-wave rectifier 53, the diode 43, the resistor 45 and the capacitor 44 may be eliminated.

In view of the above, it is to be understood that the description herein of a preferred embodiment according to the invention is set forth as an example thereof and is not to be construed or interpreted as a limitation on the claims which follow and define the invention.

What is claimed is:

1. Apparatus for controlling the speed of a D.C. motor supplied with power from an A.C. power source, comprising:
   a. means coupled to the A.C. power source for applying a variable rectified voltage to the D.C. motor;
   b. means for providing a signal which is proportional to the current drawn from the A.C. power source by the D.C. motor; and
   c. means responsive to the magnitude of the signal for varying the rectified voltage applied to the D.C.

motor, thereby regulating the speed of the D.C. motor, said means responsive to the signal including pulse generating means coupled in parallel to the means for applying a variable rectified voltage and the A.C. source, said pulse generating means having means for controlling the timing of its output pulses with respect to the timing of the A.C. source cycles so that the rectified voltage initially applied to the D.C. motor increases at a controlled rate to its steady state value, thereby increasing the speed of the D.C. motor at a controlled rate to its operating speed.

2. Apparatus as defined in claim 1 wherein said means for applying a variable rectified voltage to the D.C. motor are connected in series with said means for providing a signal which is proportional to the current drawn from the A.C. power source by the D.C. motor.

3. Apparatus as defined in claim 1 wherein said means for applying a variable rectified voltage include a controlled rectifier and wherein said means for providing a signal which is proportional to the current drawn by the motor includes a current transformer, the primary winding of the current transformer being connected in series with the input terminals of the controlled rectifier.

4. Apparatus as defined in claim 1 wherein said pulse generating means includes at least one full-wave rectifier coupled to the means for applying a variable rectified voltage to the D.C. motor, a silicon unilateral switch, and means coupling the silicon unilateral switch to the full-wave rectifier, the output of the silicon unilateral switch being coupled to the means for applying a variable rectified voltage to the D.C. motor.

5. Apparatus as defined in claim 1 wherein said means for applying a variable rectified voltage to the D.C. motor is a controlled rectifier.

6. Apparatus as defined in claim 5 wherein said pulse generating means is coupled to the A.C. source by a transformer and includes a first full-wave rectifier coupled to the transformer, a current transformer connected in series with the controlled rectifier, a second full-wave rectifier coupled to the current transformer, a silicon unilateral switch, means coupling the unilateral switch to the first and second full-wave rectifiers, and means coupling the output of the silicon unilateral switch to the controlled rectifier.

7. Apparatus as defined in claim 6 further including a variable resistor connected in parallel to the second full-wave rectifier and the current transformer for controlling the operating speed of the D.C. motor.

8. Apparatus as defined in claim 6 wherein said means coupling the unilateral switch to the first and second full-wave rectifier includes a variable resistor for controlling the time required to bring the D.C. motor up to its operating speed.

* * * * *